(12) United States Patent
McDuff et al.

(10) Patent No.: US 7,530,519 B2
(45) Date of Patent: May 12, 2009

(54) VERTICALLY ADJUSTABLE DEVICE FOR SUSPENDING AN ARTICLE FROM A CEILING

(75) Inventors: Pierre McDuff, Outremont (CA); Lang Nguyen-Huu, Dollard-des-Ormeaux (CA)

(73) Assignee: Cobra Fixations CCIE LTEE - Cobra Anchors Co., Ltd., Montreal, Quebec (CA)

( * ) Notice: Subject to any disclaimer, the term of this patent is extended or adjusted under 35 U.S.C. 154(b) by 333 days.

(21) Appl. No.: 10/564,770

(22) PCT Filed: Jul. 14, 2004

(86) PCT No.: PCT/CA2004/001006

§ 371 (c)(1),
(2), (4) Date: Feb. 14, 2006

(87) PCT Pub. No.: WO2005/005883

PCT Pub. Date: Jan. 20, 2005

(65) Prior Publication Data

US 2006/0285939 A1     Dec. 21, 2006

Related U.S. Application Data

(60) Provisional application No. 60/486,465, filed on Jul. 14, 2003.

(51) Int. Cl.
*B65H 75/30*     (2006.01)
(52) U.S. Cl. .................................................. 242/385.4
(58) Field of Classification Search ............... 242/385, 242/385.4
See application file for complete search history.

(56) References Cited

U.S. PATENT DOCUMENTS

| 376,657 | A | * | 1/1888 | Jenkins | 242/385.4 |
| 1,748,601 | A | * | 2/1930 | Gottlieb | 242/385.4 |
| 1,927,216 | A | * | 9/1933 | Porter et al. | 242/385.4 |
| 2,306,611 | A | * | 12/1942 | Benjamin | 242/385.4 |
| 4,187,996 | A | | 2/1980 | Ehrlich | |
| 5,065,971 | A | | 11/1991 | Gaube | |
| 6,230,440 | B1 | * | 5/2001 | Deutsch | |

FOREIGN PATENT DOCUMENTS

| BE | 795 454 | 5/1973 |
| DE | 39 048 | 9/1886 |
| DE | 346 719 | 1/1922 |
| DE | 33 23 716 | 5/1984 |
| EP | 0 483 069 | 4/1992 |
| GB | 616 556 | 1/1949 |

* cited by examiner

*Primary Examiner*—William A Rivera
(74) *Attorney, Agent, or Firm*—Ladas & Parry LLP

(57) ABSTRACT

A vertically adjustable fixture, such as a ceiling hook, comprises a base member adapted to be secured to an overhead surface, e.g. a ceiling, a beaded cable retractable in and extendable out of the base member, and a hook at a lower end of the cable for connection to an article such that the article may be suspended from the ceiling. An extension/retraction mechanism provided in the base member includes a fixed axle and a reel rotatable around the axle, with a spring force existing therebetween, the cable being partly wound around the reel. The elevation of the hook is maintained by one of the beads of the cable firmly lodging, in a locked position thereof, in a recess defined at the bottom of the cover. Manipulation of the cable to dislodge the bead from the recess unlocks the cable, thereby allowing the elevation of the hook to be adjusted.

30 Claims, 16 Drawing Sheets

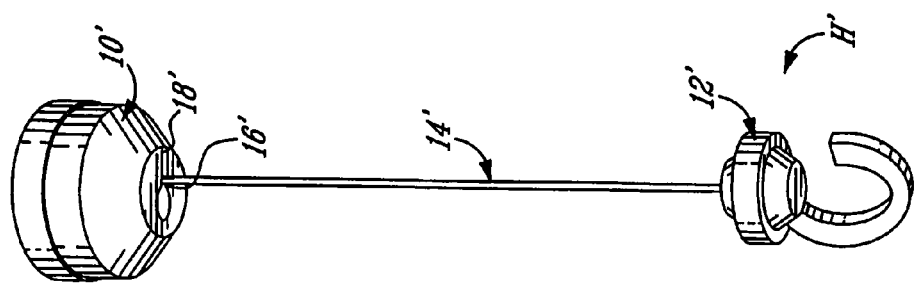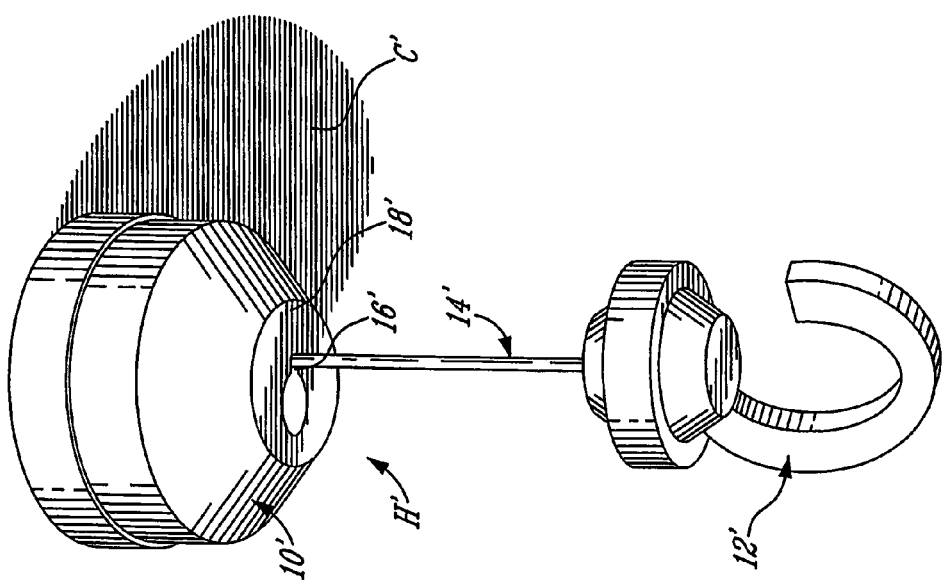

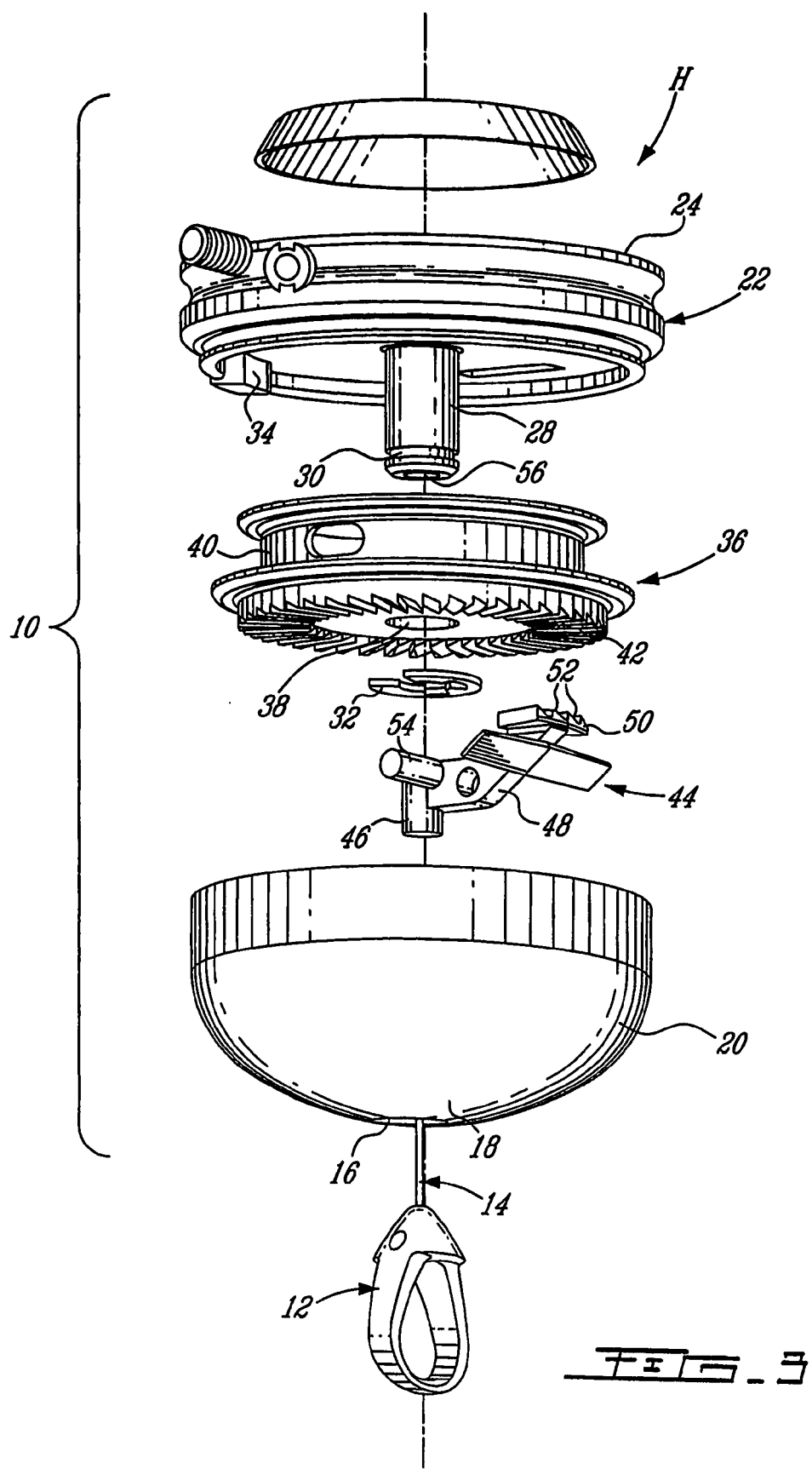
FIG_3

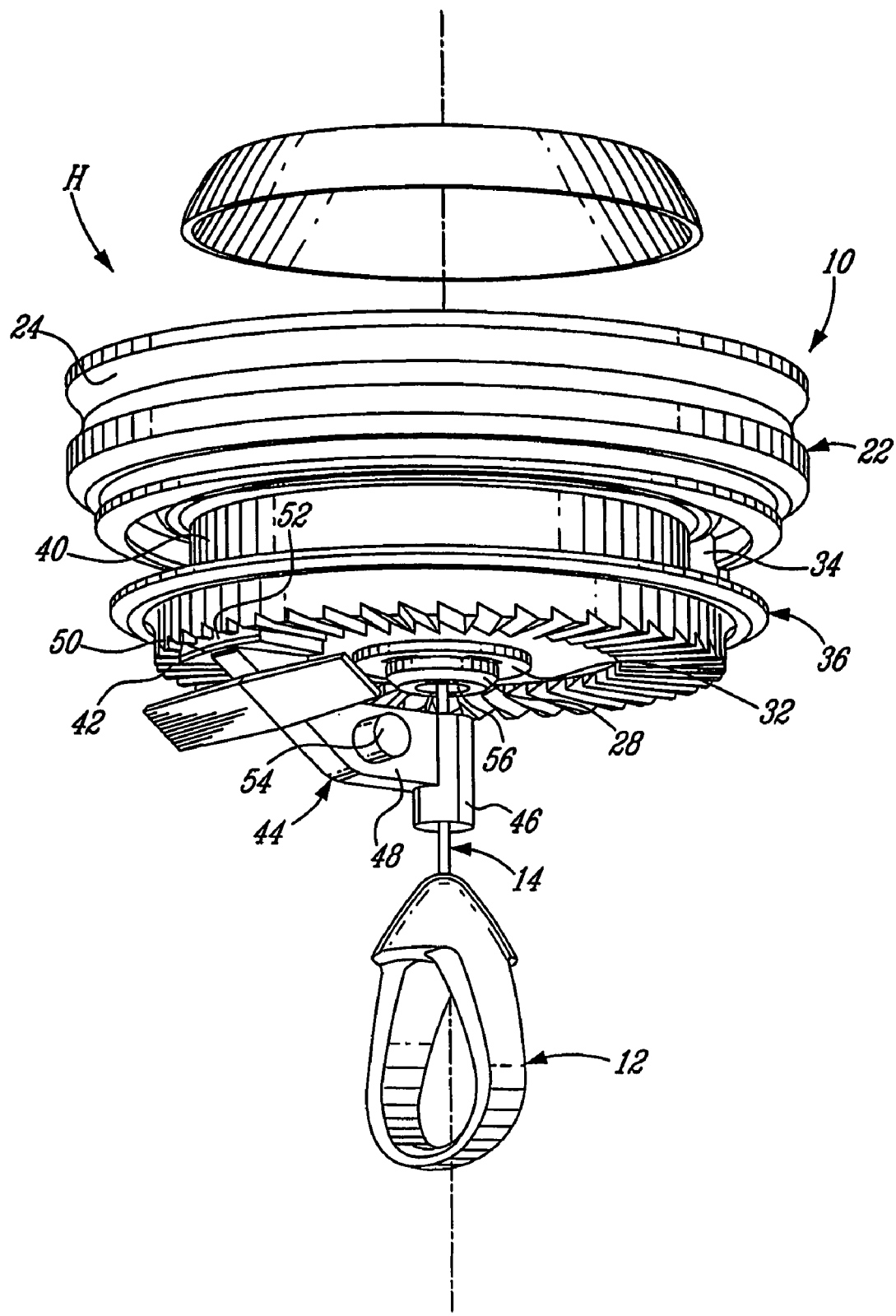
FIG_4

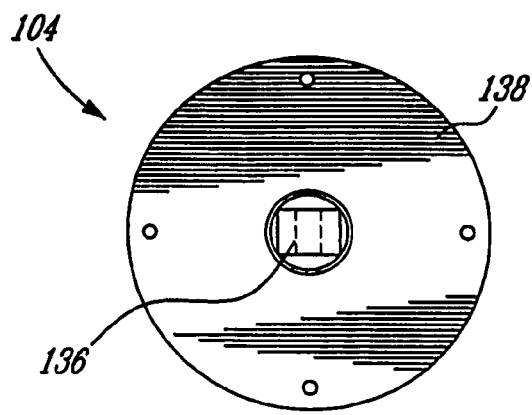
FIG_14
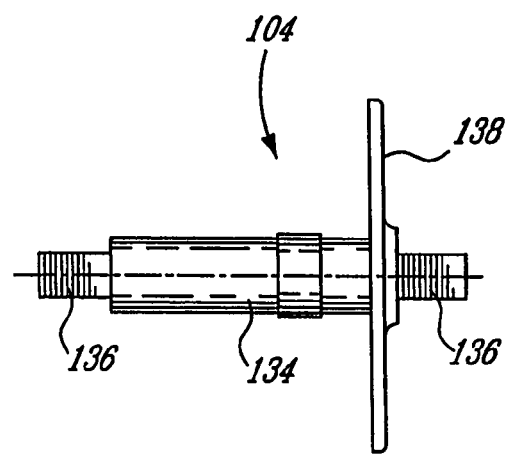
FIG_15
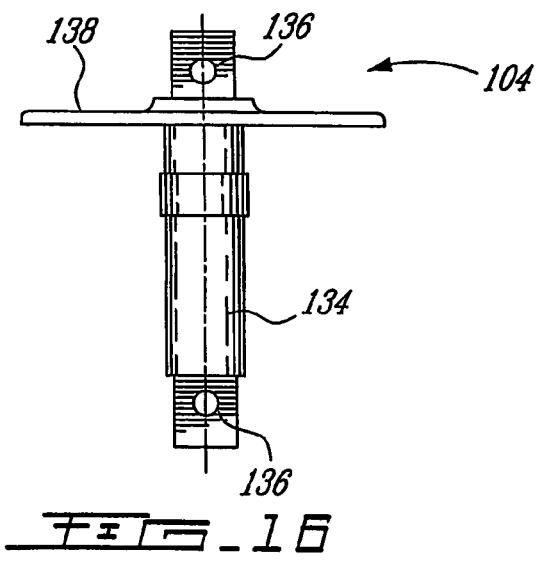
FIG_16

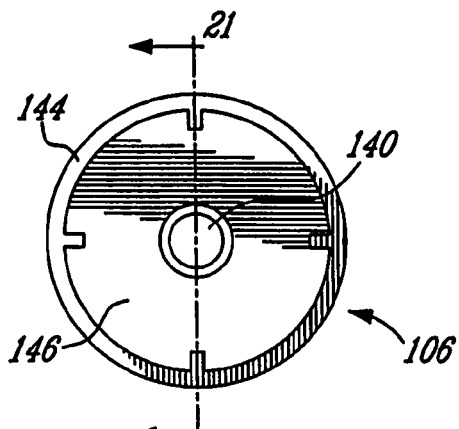
FIG._17
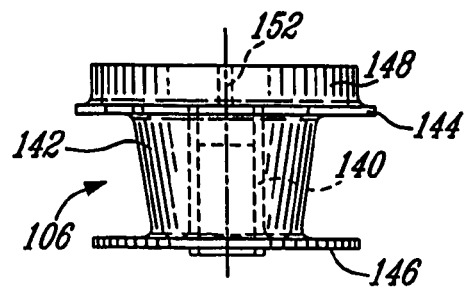
FIG._18
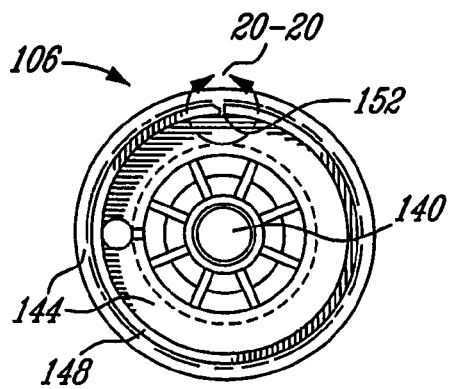
FIG._19
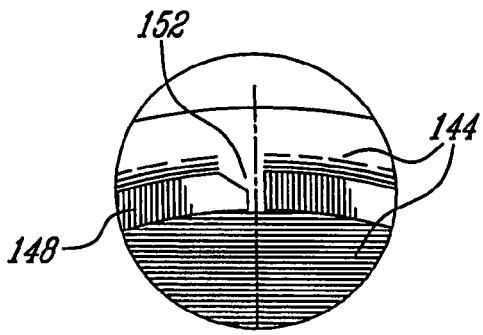
FIG._20
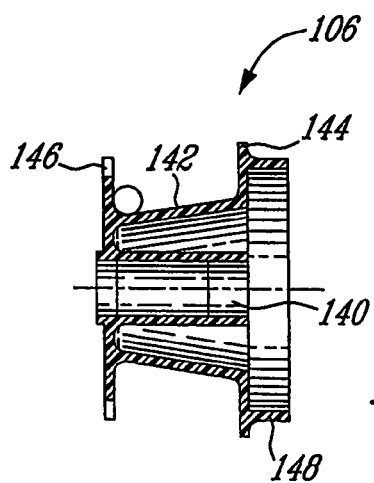
FIG._21

VERTICALLY ADJUSTABLE DEVICE FOR SUSPENDING AN ARTICLE FROM A CEILING

CROSS REFERENCE TO RELATED APPLICATIONS

This application is a National Entry Application of PCT Application No. PCT/CA2004/1001006, filed on Jul. 14, 2004, which itself claims priority on U.S. application Ser. No. 60/486,465, filed on Jul. 14, 2003. All documents above are herein incorporated by reference.

BACKGROUND OF THE INVENTION

1. Field of the Invention

The present invention relates to ceiling-mounted fixtures and, more particularly, to a device that can be mounted to a ceiling for suspending an article, e.g. a plant, from the ceiling.

2. Description of the Prior Art

It is well known to secure hooks to a room's ceiling in order to suspend from the hook various articles, such as planters.

When it is desired to access the planter, for instance for watering purposes, one must generally stretch upwardly in order To reach the planter or must even step on a chair as planters are generally suspended in a substantially elevated position in order not to impede circulation of people in their vicinity.

The difficulties encountered while trying to reach an article suspended from a ceiling hook may even be dangerous, for instance when substantially aged people use chairs or other elevation means to access the planter.

Some devices have been developed to raise and lower a suspended plant, such as the Adjustable plant handing device disclosed in U.S. Pat. No. 5,065,971, which issued on Nov. 19, 1991 to Gaube. The height adjustable device of this Patent comprises a locking mechanism mounted above the planter, a handle and a cable attached at a first end thereof to the planter and at second end thereof to a reel biasedly mounted in the handle. The cable passes through the locking member and is partly wound around the handle's reel. The locking mechanism includes a pair of fixed wheels which guide the cable therethrough, and a toothed locking arm pivotally mounted therein. The, locking aim is biased towards a first one of the wheels, whereby the cable can be secured between the locking arm and the first wheel. Tension provided in the cable by the handle draws the locking arm away from the cable so as to release the latter and allow movement thereof through the locking mechanism, whereby the planter can be selectively raised and lowered. The toothed locking arm returns to a cable locking position against the first wheel by providing a sudden slack in the cable via the handle. A disengageable brake acting on the reel allows the handle to be positioned at various elevations.

SUMMARY OF THE INVENTION

It is therefore an aim of the present invention to provide a novel ceiling fixture that allows an article attached thereto to be raised and lowered.

It is also an aim of the present invention to provide a ceiling fixture that allows an article attached thereto to be raised and lowered and which can selectively lock the article at various elevations.

Therefore, in accordance with the present invention, there is provided a vertically adjustable fixture adapted to be secured to an overhead surface, comprising a base member adapted to be secured to a surface, a flexible elongated member retractable in and extendable out of said base member, a rotatable reel provided in said base member with said elongated member being partly wound around said reel, and a locking mechanism adapted in a locked position to lock said elongated member with respect to said base member, with said elongated member being selectively displaceable to disengage said locking mechanism to an unlocked position thereby allowing said elongated member to be displaced relative to said base member by selectively retracting said elongated member into, or withdrawing it from, said base member.

More particularly, said locking mechanism is provided in said base member, said elongated member including a series of spaced apart enlargements distributed thereon, said locking mechanism being adapted to engage in said locked position at least one of said enlargements thereby preventing said elongated member from further unwinding from said reel.

Typically, said enlargements include beads that are substantially equally spaced one after the other. For instance, said elongated member can comprise a string extending through said beads, said beads being fixedly mounted to said string.

Furthermore, said locking member can include a receiving means adapted to receive therein one of said enlargements, said elongated member between said enlargements thereof being slidable in and out of said receiving means when said one of said enlargements is dislodged from said receiving means. In such a case, said receiving means can comprise an angled retention element that opens up onto an opening defined at a lower end of said base member and through which said elongated member extends.

For example, said retention element comprises a recess adapted to receive said one of said beads, and a notch joining said opening and a bottom of said recess, said elongated member between said enlargements thereof being slidable in and out of said recess via said notch, wherein in said locked position said one bead is lodged in said recess with gravity forces acting downwardly on said elongated member retaining said one bead in said recess, and wherein, to disengage said one bead from said locking member, said gravity forces are sufficiently opposed for allowing said one bead to be removed from said recess thereby allowing said elongated member to be wound around, or unwound from, said reel for changing an elevation of an article suspended by said elongated member.

Alternatively, said retention element comprises a pair of spaced apart fingers defining a gap therebetween which communicates at one end thereof with said opening and which is sufficiently closed at an opposed end thereof, said elongated member between said enlargements thereof being adapted to be received in said gap while said one bead is supported by said fingers, wherein in said locked position said one bead is supported by said fingers gravity forces acting downwardly on said elongated member retaining said one bead on said fingers, and wherein, to disengage said one bead from said locking member, said gravity forces are sufficiently opposed for allowing said one bead to be withdrawn from said fingers Thereby allowing said elongated member to be wound around, or unwound from, said reel for changing an elevation of an article suspended by said elongated member. Typically, said fingers are angled downwardly in a direction away from said opening of said base member.

Moreover, a shaft is fixedly mounted in said base member, said reel being rotatable about said shaft, a biasing means being provided between said reel and a fixed part of one of said base member and said shaft, said biasing means being adapted to encourage winding of said elongated member around said reel. Said biasing means exerts a spring force less than a downward force exerted on said reel by an article suspended from said elongated member, whereby in a suspended position of The article, said locking mechanism retains said one of said enlargements in said locked position, whereas to disengage said one bead from said locking member, said downward forces are sufficiently opposed to allow said elongated member to assume said unlocked position thereby allowing said elongated member to be wound around, or unwound from, said reel for changing an elevation of the article.

Also, a shaft flange is generally provided on said shaft outwardly of said reel, said reel including a hub for receiving windings of said elongated member therearound, said hub being rotatably mounted around said shaft, first and second reel flanges being provided at opposed ends of said hub for retaining said windings around said hub. Said hub may be of frusto-conical shape.

A wall may extend between said shaft flange and said first reel flange thereby defining a chamber, said biasing means extending in said chamber between said reel and said fixed part. Preferably, said biasing means comprises a coiled spring.

Typically, an opening is defined at a lower end of said base member, said elongated member extending through said opening, said shad being off-center with respect To said opening for providing a proper orientation to said elongated member at, and/or adjacent to, said locking member.

Advantageously, a marking is provided on an outside surface of said base member for indicating to a user at least one direction in which said elongated member is to be displaced lo move said locking mechanism to said unlocked position.

Furthermore, said shaft may be angled with respect to a vertical plane extending through a portion of said elongated member which extends outwardly of said base member and along said direction.

Typically, a connector is provided at an end of said elongated member, which is located outside of said base member, said connector being adapted for suspending an item therefrom.

Also in accordance with the present invention, there is provided a vertically adjustable fixture adapted to be secured to an overhead surface, comprising a base member adapted to be secured to a surface, a flexible elongated member retractable in and extendable out of said base member, and a locking mechanism adapted in a locked position to lock said elongated member with respect to said base member, with said elongated member being selectively displaceable to disengage said locking mechanism to an unlocked position thereby allowing said elongated member to be displaced relative to said base member by selectively retracting said elongated member into, or withdrawing it from, said base member.

Further in accordance with the present invention, there is provided a vertically adjustable fixture adapted to be secured to an overhead surface, comprising a base member adapted to be secured to a surface, and a flexible elongated member retractable in and extendable out of said base member, said base member including a fixed member adapted to be mounted to the surface, a mobile member and a locking member, said locking member being adapted in a locked position thereof to lock said mobile member to said fixed member and being adapted in an unlocked position thereof to allow said mobile to displace relative to said fixed member while causing said elongated member to selectively retract into, or withdraw from, said base member.

More particularly, said mobile member comprises a reel capable of rotation within said fixed member, said elongated member being wound around said reel, said locking member being adapted to engage or disengage said reel and thus respectively adopting said locked or unlocked position depending on a position of a portion of said elongated member extending below said base member, whereby said portion of said elongated member may be displaced for selectively moving said locking member into, or out of, engagement with said reel thereby respectively preventing or allowing said elongated member to be vertically displaced relative to said base member.

Typically, said locking member is mounted to said elongated member within said base member, and a spring is provided between said fixed member and said mobile member for urging, when in said unlocked position, said elongated member towards a retracted position.

Still further in accordance with the present invention, there is provided a method for changing an elevation of an item suspended from a fixture, comprising the steps of:

(a) providing a fixture having a base adapted to be mounted to an overhead surface, a flexible elongated member retractable in and extendable out of said base, an item attached to said elongated member being in a suspended attitude thereof, said elongated member being in a locked position with respect to said base;

(b) elevating said item and displacing said elongated member sideways to an unlocked position thereof;

(c) selectively winding said elongated member around said reel or unwinding it therefrom until said item is substantially at a desired elevation; and (d) handling said elongated member back into said locked position while releasing said item to said suspended attitude thereof.

BRIEF DESCRIPTION OF THE DRAWINGS

Having thus generally described the nature of the invention, reference will now be made to the accompanying drawings, showing by way of illustration a preferred embodiment thereof, and in which:

FIG. 1 is a perspective view of a ceiling hook in accordance with a first embodiment of the present invention shown in a first, retracted, position;

FIG. 2 is a perspective view, similar to FIG. 1, but showing the ceiling hook in a more extended position;

FIG. 3 is an exploded perspective view of a ceiling hook in accordance with a second embodiment of the present invention;

FIG. 4 is a perspective view of the ceiling hook of FIG. 3 minus an aesthetic cover thereof that is not shown in FIG. 4 for illustration purposes;

FIGS. 14, 15 and 16 are respectively detailed front elevational, side elevational and top plan views of an axle of the ceiling device of FIG. 8;

FIGS. 17, 18 and 19 are respectively detailed front elevational, top plan and rear elevational views of a reel of the ceiling device of FIG. 8;

FIG. 20 is an enlarged view of the portion of the reel indicated by bubble 20-20 in FIG. 19;

FIG. 21 is a vertical cross-sectional view of the reel taken along line 21-21 in FIG. 17;

DESCRIPTION OF THE PREFERRED EMBODIMENTS

Figure 5A:
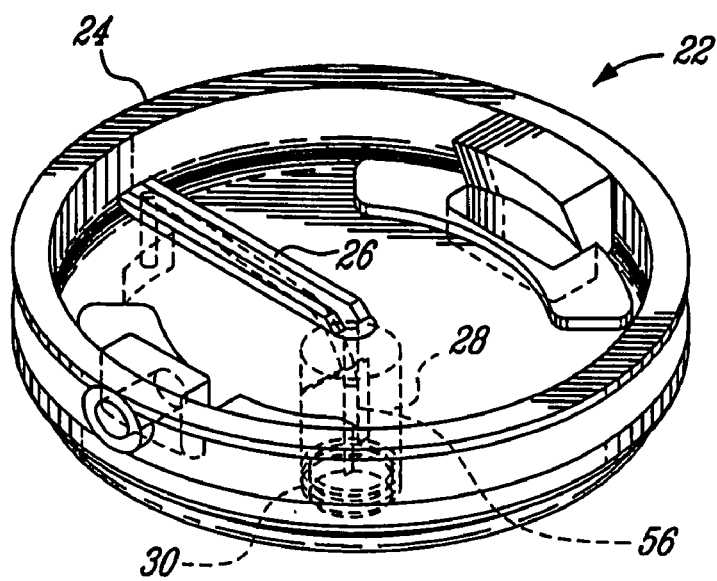
FIGS. 5A to 5D are respectively perspective, top plan, front elevational and side elevational views of a base of the ceiling hook of FIGS. 3 and 4.
Figure 5B:
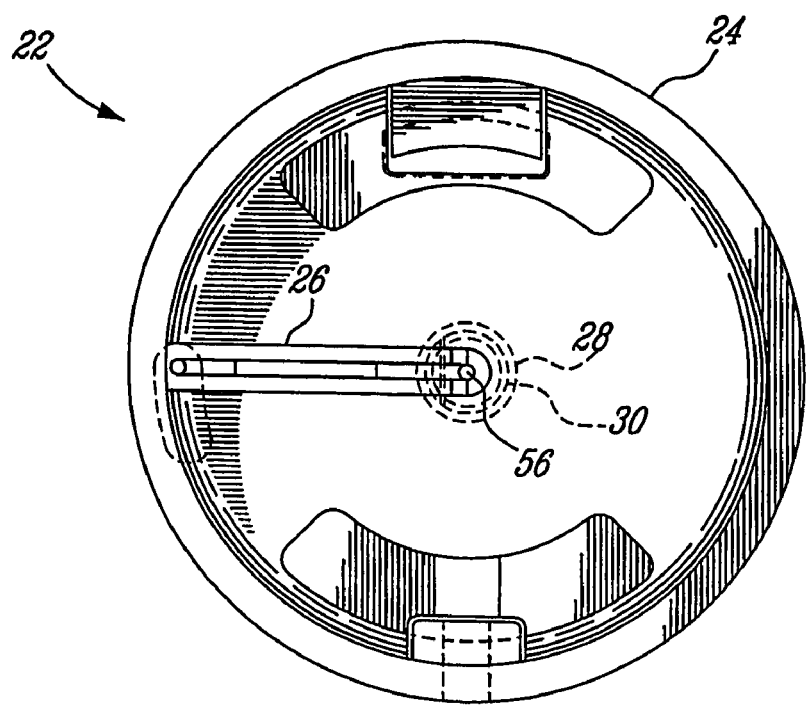
Figure 5C:
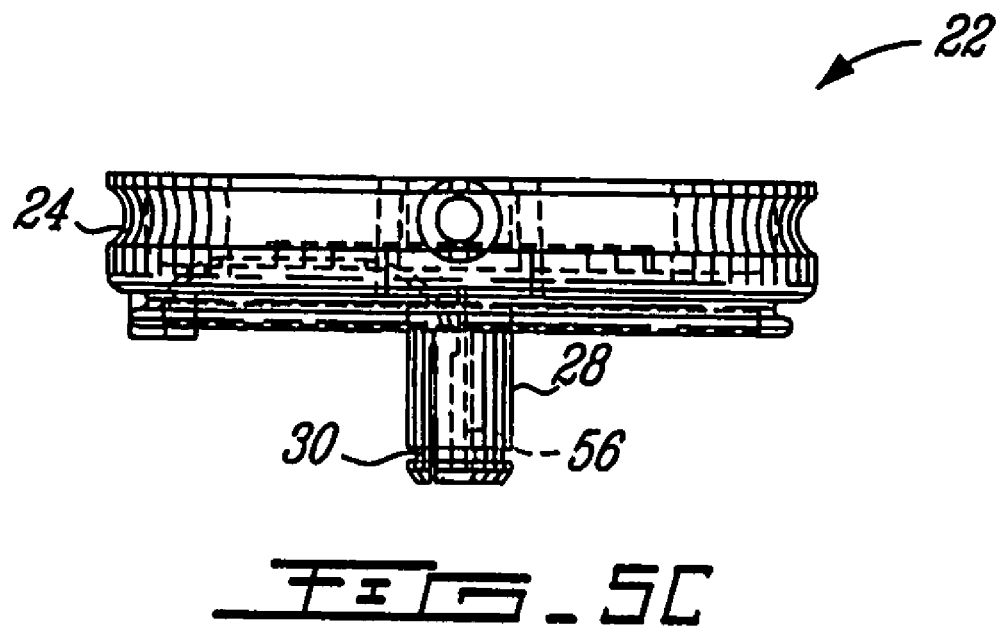
Figure 5D:
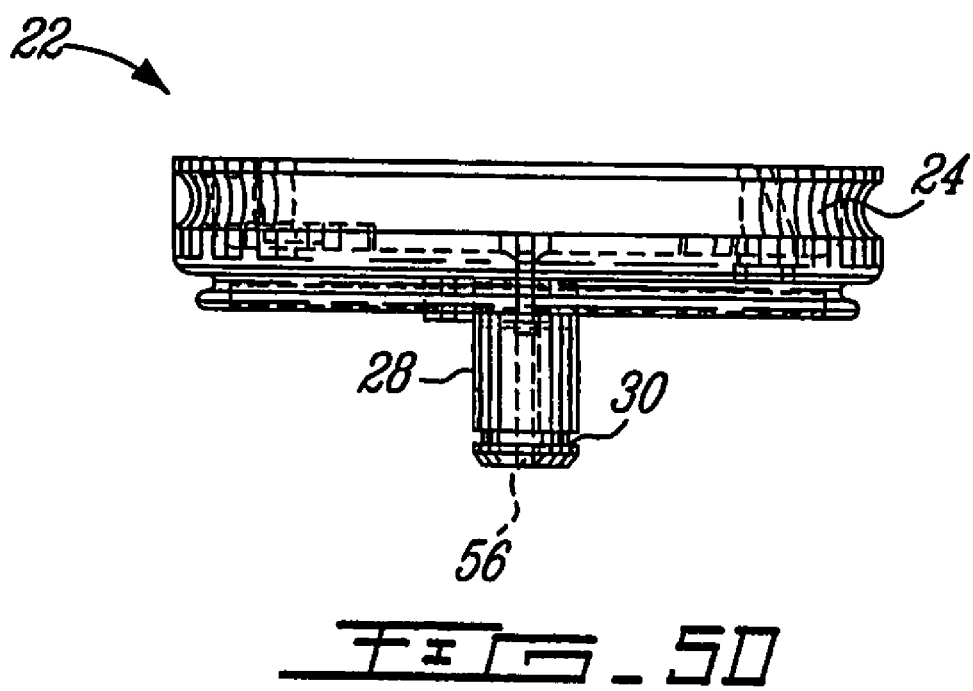
Figure 6A:
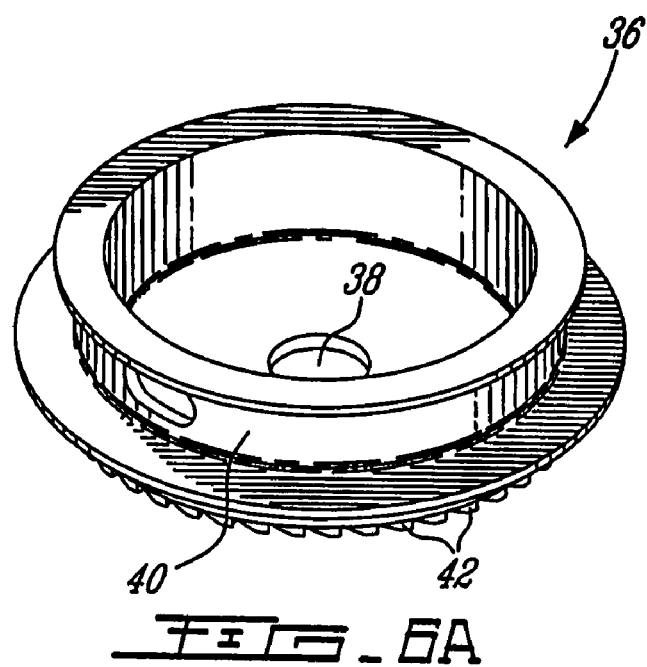
FIGS. 6A to 6D are respectively perspective, top plan, front elevational and side elevational views of a reel of the ceiling hook of FIGS. 3 and 4.
Figure 6B:
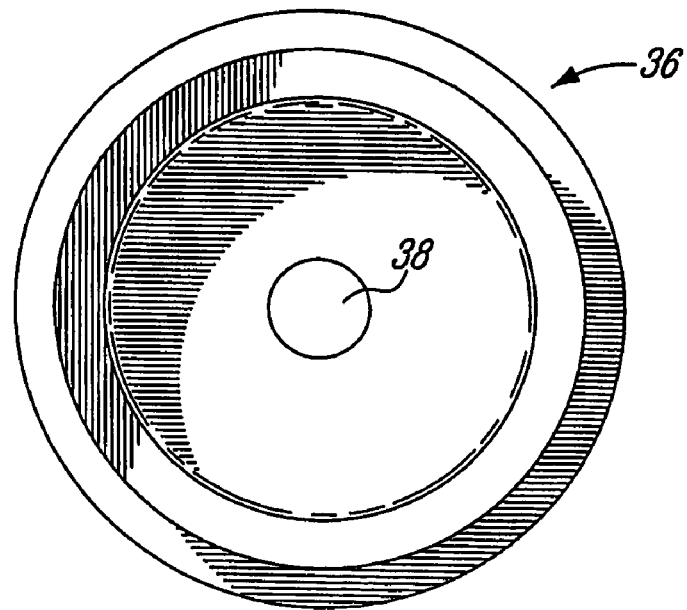
Figure 6C:
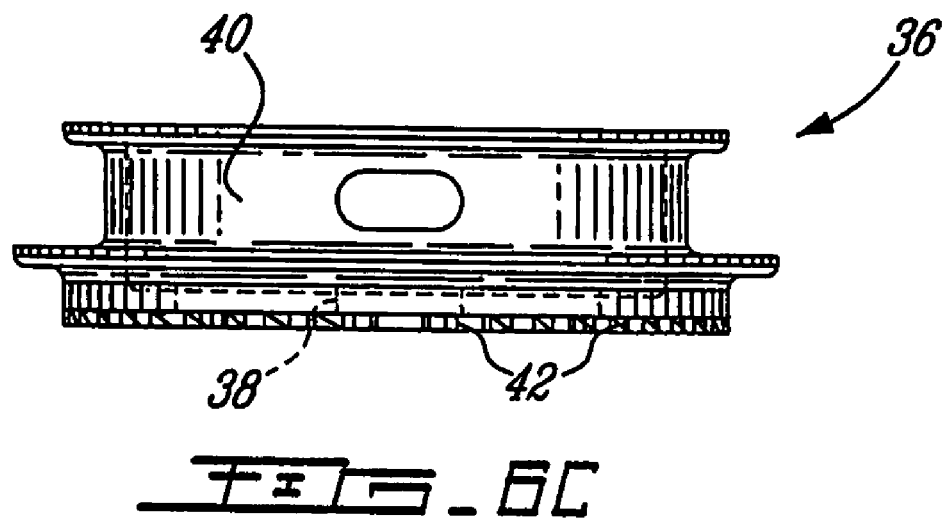
Figure 6D:
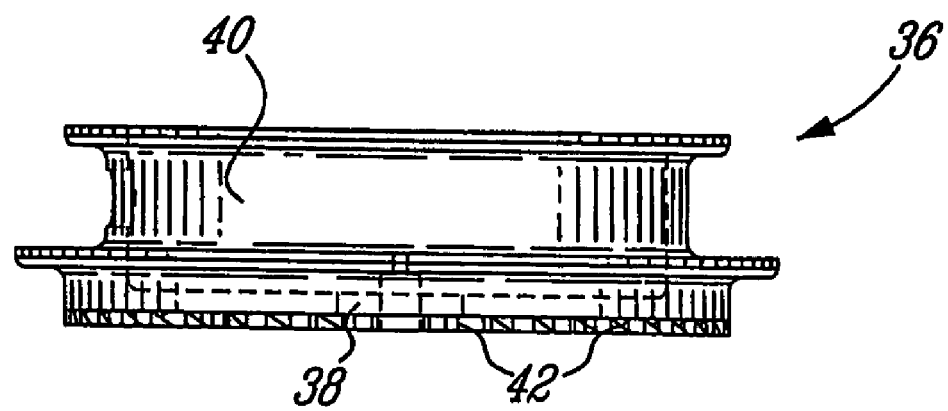
Figure 7A:
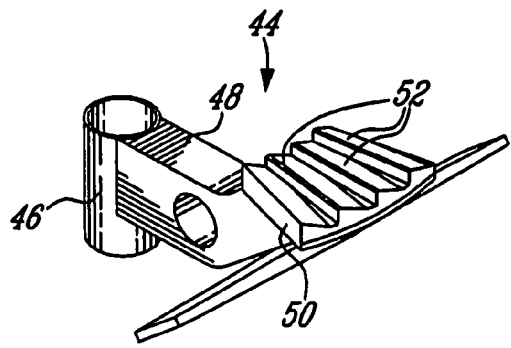
FIGS. 7A to 7D are respectively perspective, top plan, front elevational and side elevational views of a locking mechanism of the ceiling hook of FIGS. 3 and 4.
Figure 7B:
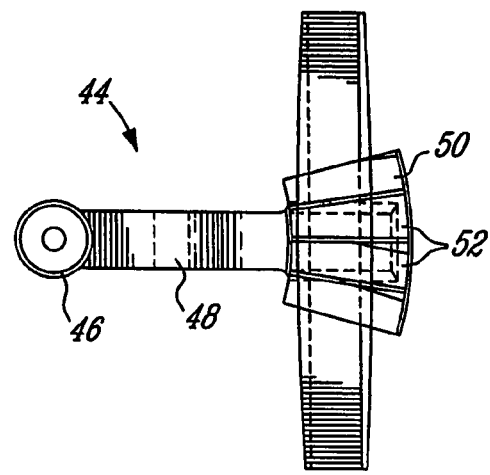
Figure 7C:
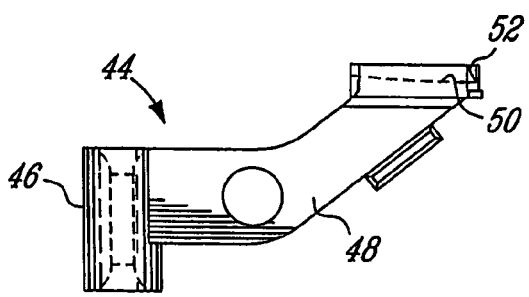
Figure 7D:
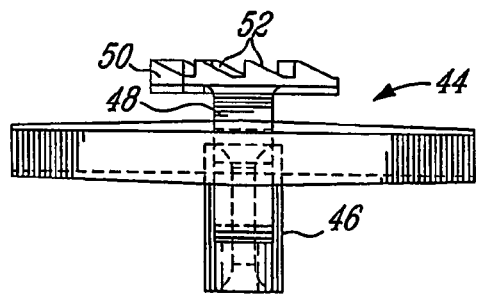
Figure 8:
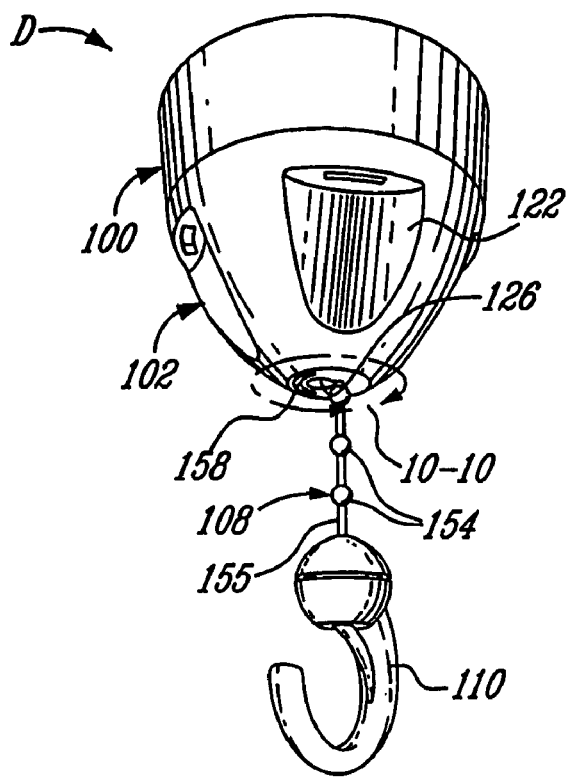
FIG. 8 is a perspective view of a ceiling device in accordance with a third embodiment of the present invention.
Figure 9:
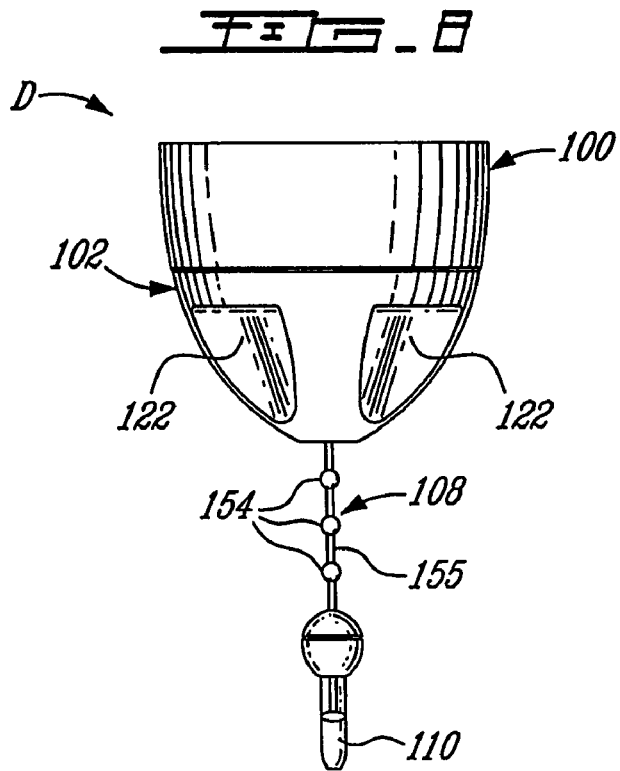
FIG. 9 is an elevational view of the ceiling device of FIG. 8.

In accordance with the present invention, FIGS. 1 and 2 illustrate a ceiling hook H' that comprises a base 10' adapted to be secured to a ceiling C', a hook 12' for suspending articles therefrom, such as planters, and a retractable cable 14', or the like, that connects the hook 12' to the base 10'. Generally, a lower end of the cable 14' is fixedly attached to an upper end of the hook 12', whereas an upper end of the cable 14' is secured to a mechanism located inside the base 10' and adapted to allow the cable 14' to retract in, or to be extended from, the base 10', thereby adjusting the elevation of the hook 12' and thus of the article attached thereto. The base 10' defines an elongated, e.g. oblong, opening 16' in a lower wall 18' thereof, with the cable 14' extending downwardly through the base 10' via the elongated opening 16'. The internal structure of the base 10' will become more apparent from the following description of a variant ceiling hook H illustrated in FIGS. 3 to 7.

Accordingly, FIGS. 3 to 7 illustrate the ceiling hook H which is substantially similar to the ceiling hook H' of FIGS. 1 and 2, except for the shape of their respective hooks and of the external covers of their bases. More particularly, the ceiling hook H comprises a base 10, a book 12, a cable 14, and an elongated opening 16 defined in a lower wall 18 of a cover 20 of the base 10.

The hook 12 can obviously take various configurations, such as the closed hook 12 of FIGS. 3 and 4 the open hook 12' of FIGS. 1 and 2, etc.

The base 10 comprises an annular member 22 adapted to be fixedly secured to the ceiling, the annular member 22 being shown in isolation in FIGS. 5A to 5D. The annular member 22 comprises a substantially annular exterior housing 24, an arm 26 extending radially inwardly from the housing 24 and a hub 28 extending downwardly from an inner end of the arm 26 and centrally of the housing 24. The hub 28 defines at a lower end thereof a circular groove 30 adapted for receiving a circlip 32 for reasons which will become apparent hereinafter. The annular member 22 includes a coil spring 34.

The base 10 also includes a reel 36 which defines a central opening 38 such that the reel 36 can be rotatably engaged around the hub 28 and retained thereat with the circlip 32. The reel 36 is thus rotatably mounted to the hub 28 and thus within the annular member 22. The reel 36 is shown in isolation in FIGS. 6A to 6D. The reel 36 defines an upper circular channel 40 and a lower annular array of ratchet teeth 42.

As seen in FIGS. 3 and 4 and in isolation in FIGS. 7A to 7D, a toothed locking member 44 comprises a central cylinder 46, a radially extending arm 48 provided at its upper end with a u locking element 50 defining a series of ratchet teeth 52, and a pin 54 extending horizontally sideways of the radial arm 48. The cable 14 extends through the cylinder 46 of the locking member 44. The locking member 44 typically rests onto the internal surface of the cover 20 with its cylinder 46 having a lower end thereof engaged in the oblong opening 16. When at rest, the cylinder 46 and he cable 14 extend vertically through the cover 20, that is on an inside end of the oblong opening 16, with the cylinder 46 and the cable 14 being generally co-linear with an axis of the hub 28 and a rotation axis of the reel 36.

The coil spring 34 is typically fixedly connected at opposed ends thereof to the housing 24 of the annular member 22 and to the reel 36. The cable 14 extends upwardly from the hook 12 through the oblong opening 16 and cylinder 46, through a central aperture 56 defined in the hub 28, sideways and outwardly along the radial arm 26, downwardly along the housing 24 and is then inwardly secured to the reel 36, such that rotation of the reel 36 causes the cable 14 to wind on, or to unwind from, the channel 40 of the reel 36. Rotation of the reel 36 is prevented by the engagement of the teeth 52 of the locking element 50 of the locking member 44 with the teeth 42 of the reel 36.

Accordingly, when it is desired to lower the hook 12, from which for example there is suspended a planter, the planter is displaced sideways by the user, that is along the direction of the oblong opening 16 and towards an outer end thereof, such a movement of the planter and of the cable 14 causing the displacement of the cylinder 46 outwardly within the oblong opening 16, thereby disengaging the locking member 44 from the teeth 42 of the reel 36. Then, as the reel 36 is able to rotate within the annular member 22, the user can allow the planter to displace downwardly by gravity, while the user supports the planter in its descent, until the planter is at a desired height, at which point the user brings the planter centrally under the ceiling hook H such that the cylinder 46 displaces inwardly along the oblong opening 16 and causes the locking element 50 connected thereto to engage the teeth 42 of the reel 36 thereby locking the reel 36 and thus retaining the hook 12 at the selected height.

It is noted that, when the teeth 42 and 52 are disengaged from each other and during the lowering of the hook 12, the cable 14 unwinds from the reel 36 against the bias of the coil spring 34, with the cable 14, as it unwinds, displacing inwardly along the arm 26, downwardly through the aperture 56 of the hub 28, through the cylinder 46 of the locking member 44 and Through the oblong opening 16.

When it is desired to raise the hook 12 and the article attached thereto, the hook 12, typically by way of said article, is simply raised, and assistance is provided by The biased coil spring 34 which causes the reel 36 to rotate thereby gradually winding the cable 14 within the channel 40 of the reel 36. Such a rotation of the reel 36 is not prevented by the locking member 44 in view of the ratchet-type configuration of the teeth 42 and 52 respectively of the reel 36 and of the locking element 50 of the toothed locking member 44.

It is noted that the cover 20 is not shown in FIG. 4 for illustration purposes.

Figure 12:
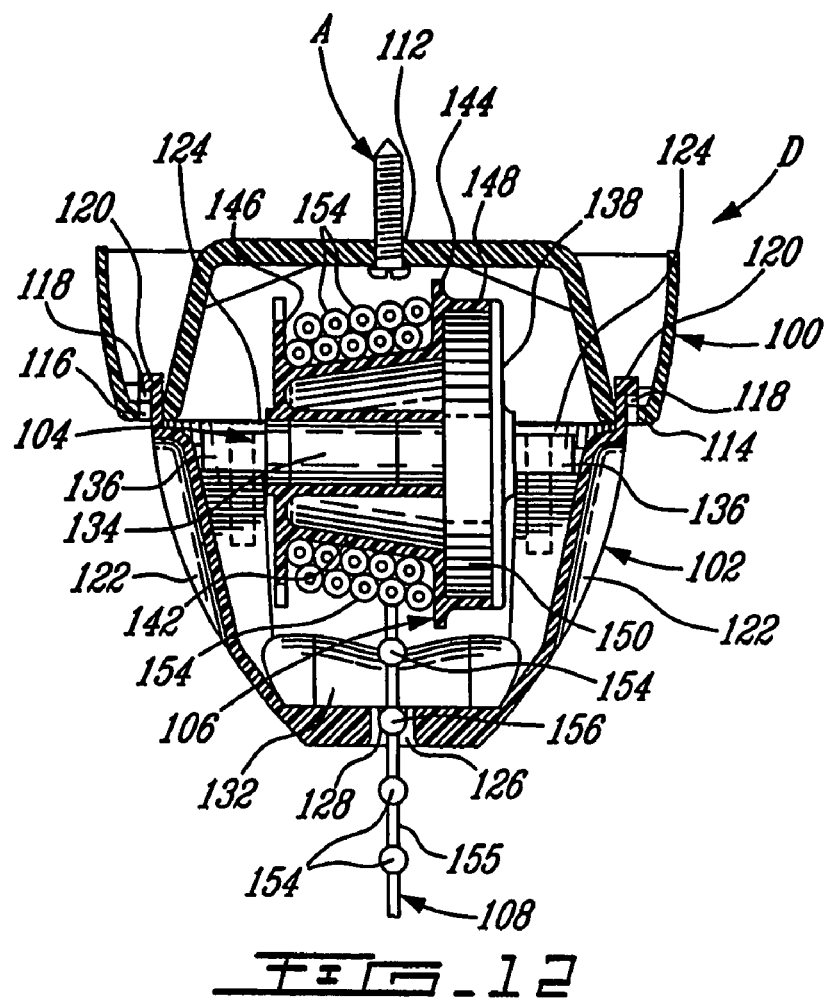
Figure 26:
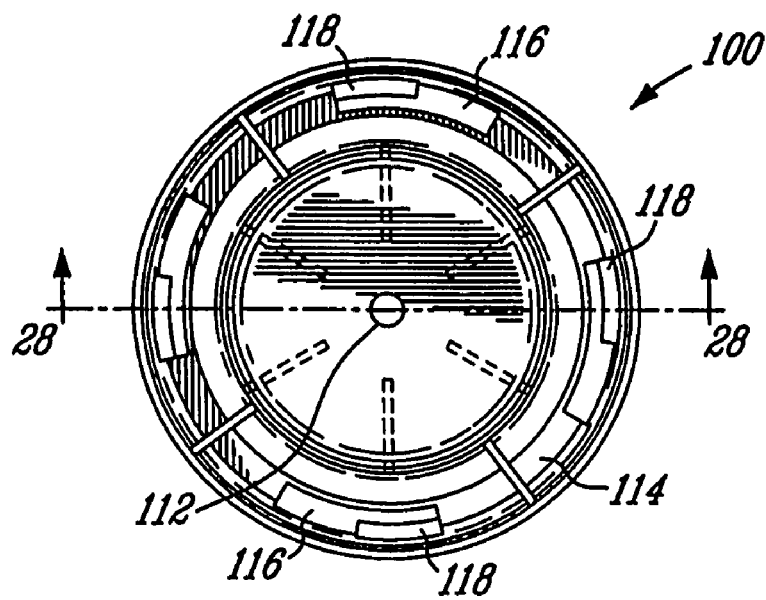
FIGS. 26 and 27 are respectively top plan and front elevational views of a base of the ceiling device of FIG. 8.
Figure 27:
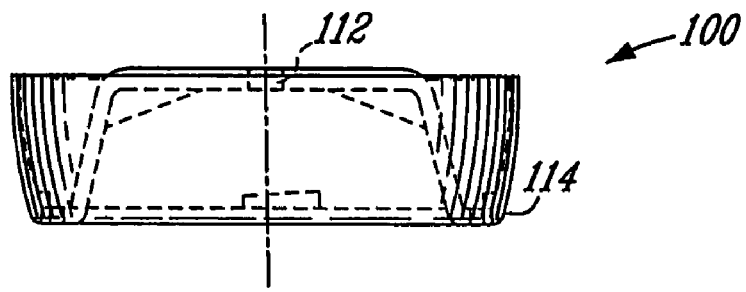
Figure 28:
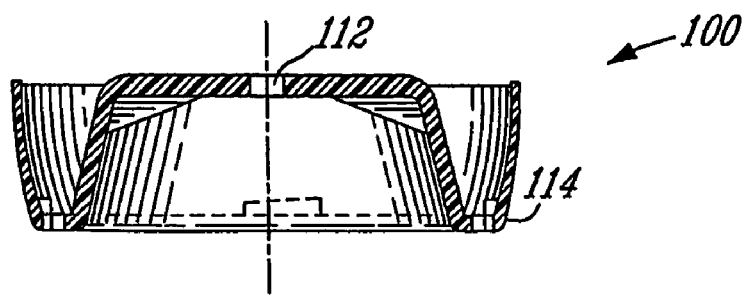
FIG. 28 is a cross-sectional view taken along line 28-28 in FIG. 26.

FIGS. 8 to 28 illustrate a vertically adjustable device D also in accordance with the present invention, for suspending an article, e.g. a plant, from a ceiling. The device D comprises basically a base 100 (see also FIGS. 26 to 28) adapted to be secured to the ceiling, a cover 102 (see also FIGS. 22 to 25) adapted to be mounted to the base 100, an extension/retraction mechanism including an axle 104 (see FIGS. 14 to 16) and a reel 106 (see FIGS. 17 to 21) both contained in the cover 102, a strong beaded cable 108 partly wound around the reel 106 (as best seen in FIG. 12) and extending through a lower end of the cover 102, and a connector such as a hook 110 that is provided on the cable 108 outwardly of the base 100 and of the cover (and typically at a lower end of the cable 108) and to which the article (not shown) to suspend from the ceiling is attached. The base 100 and the cover 102 form a base member.

The base 100 is mounted to the ceiling via an appropriate anchor A (see FIG. 12) extending upwardly through opening 112 defined in the base 100 and into the ceiling. A lower downwardly extending rim 114 of the base 100 defines four slots 116 and four associated locking tabs 118.

The cover 102 includes at an upper end thereof four upwardly extending L-shaped locking tabs 120 adapted to be slid through the slots 116 of the base 100, such that subsequent rotation of the cover 102 causes the locking tabs 120 thereof to slid above and along the locking tabs 118 of the base 100 and to thus become engaged therebehind, whereby the cover 102 is firmly secured to the base 100. Bosses can be defined on upper surfaces of the locking tabs 118 to oppose the locking tabs 120 from displacing relative thereto in a direction that could result in The cover 102 disengaging from the base 100.

Figure 13:
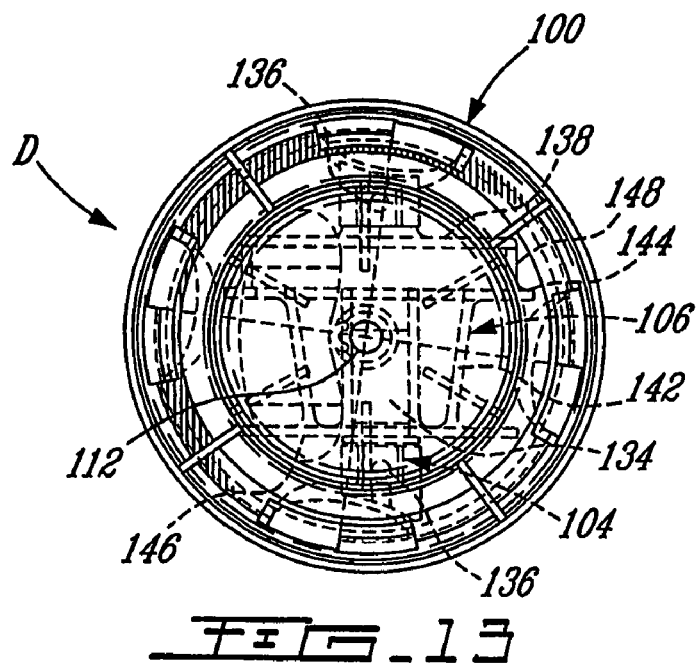
FIG. 13 is schematic top plan view of FIG. 11.
Figure 22:
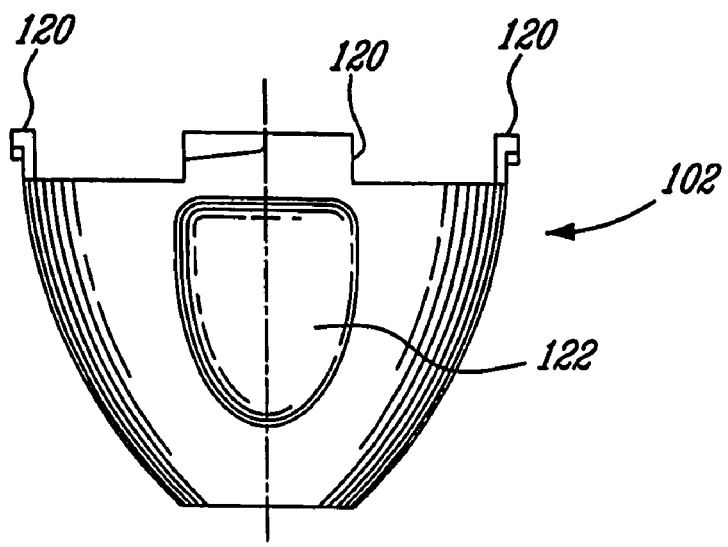
FIGS. 22 and 23 are respectively front elevational and top plan views of a cover of The ceiling device of FIG. 8.
Figure 23:
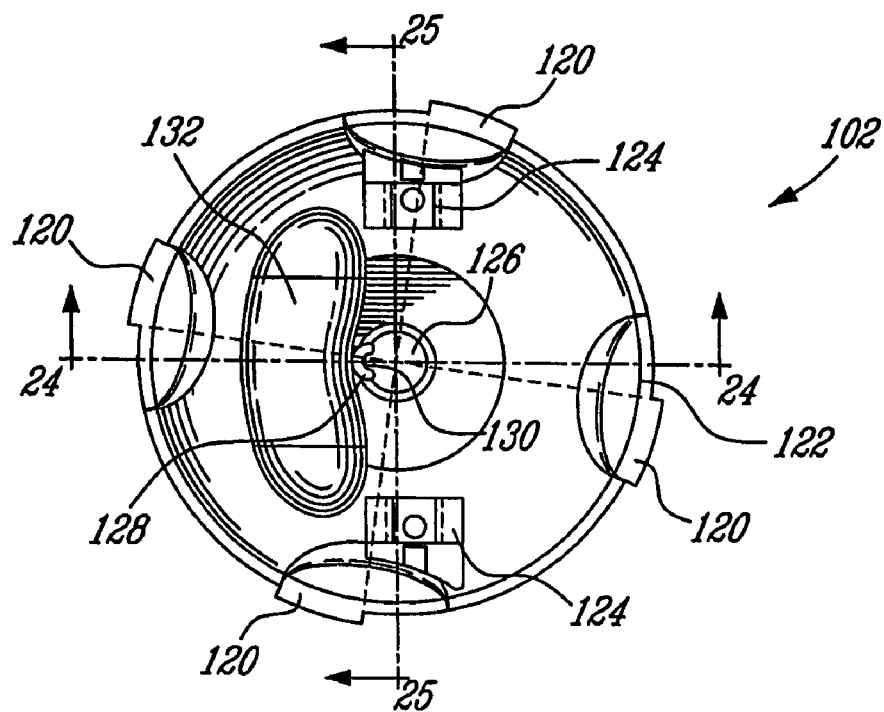
Figure 24:
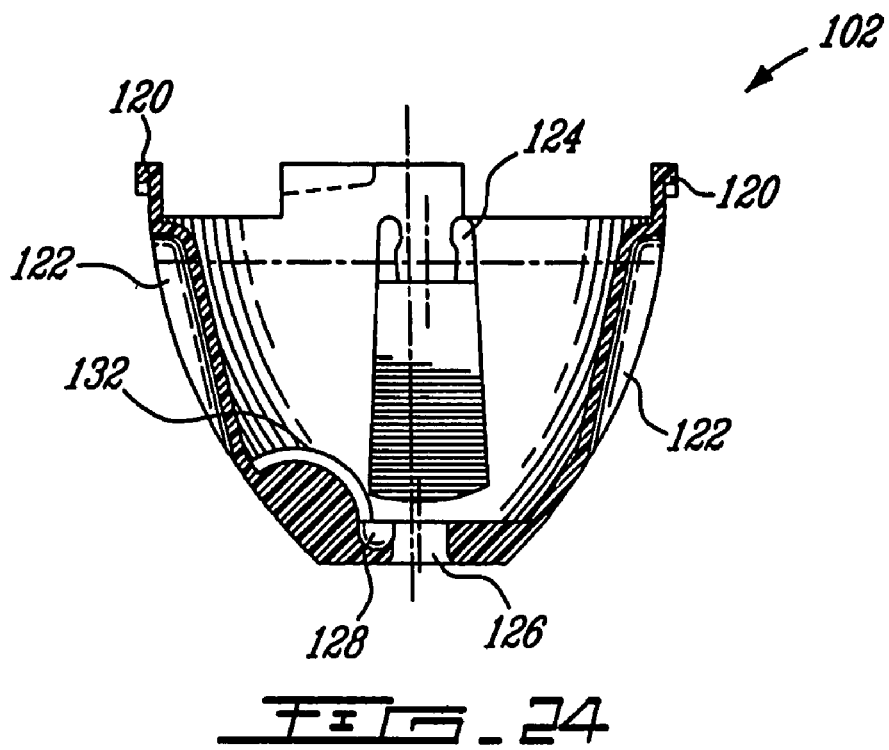
FIGS. 24 and 25 are cross-sectional views taken respectively along line 24-24 and line 25-25 in FIG. 23.
Figure 25:
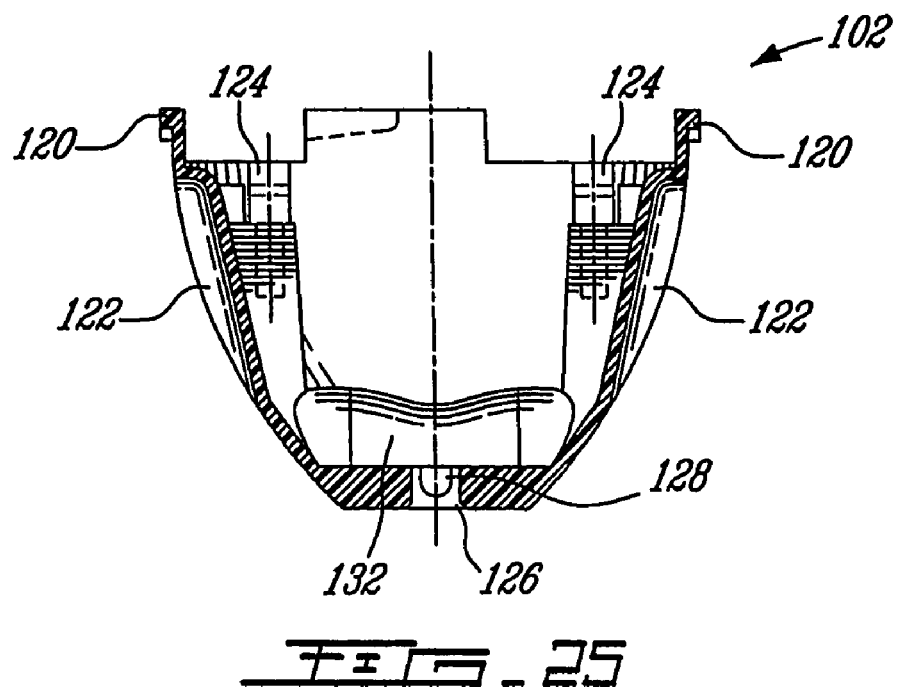

The cover 102 also defines four decorative indentations 122. On the inside surfaces of two diametrically opposed ones of these recesses 122, U-shaped clips 124 (see FIGS. 23 to 25) are provided with the ends of the axle 104 being fixedly engaged in these clips 124. The cover 102 also defines a lower opening 126 and the axle 104 is slightly off-center with respect thereto (as best seen in FIG. 13). A substantially half-spherical recess 128 is defined at the bottom of the cover 102 and adjacent to the opening 126 (see FIGS. 23 and 24), with a notch 130 being defined at the interface of The recess 128 and the opening 126. The cover 102 also includes thereinside a guide 132 (see FIGS. 23 to 25) for the beaded cable 108.

The axle 104 (see FIGS. 14 to 16) comprises a shaft 134 having opposed ends 136 that engage the U-shaped clips 124. The axle 104 also includes a flange 138.

The reel 106 (see FIGS. 17 to 21) comprises a central opening 140 so that the reel 106 can rotate about the axle 104. The reel 106 also includes a conical hub 142 and proximal and distal flanges 144 and 146, respectively. A short cylindrical wall 148 extends outwardly from the proximal flange 144 with the flange 138 of the axle 104 abutting the free end of the wall 148 thereby forming a substantially closed chamber 150 (see FIG. 12) The short cylindrical wall 148 defines a slit 152 for receiving one end of a coiled spring (not shown) that is mounted at its other end to the shaft 134 of the axle 104. Therefore, when the hook 110 is pulled away from the cover 102, the reel 106 rotates with the beaded cable 108 unwinding therefrom. Such a rotation of the reel 106 causes the end of the coiled spring attached to the wall 148 of the reel 106 also to rotate thereby creating a return force in the coiled spring (as its other end is fixed to the axle 104).

The beaded cable 108 includes a series of beads 154 fixedly mounted in a regularly distributed manner onto a strong cable or string 155. When an article is suspended from the hook 110, with the weight of this article overpowering the return spring force, the article is held in a desired elevation by a given bead 156 (amongst the beads 154) of the beaded cable 108 being securely lodged in the spherical recess 128 20 (see FIG. 11), and with the string 155 nesting in the notch 130. Because of the weight of the article, the given bead 156 cannot accidentally dislodge from the spherical recess 128. The recess 128 could be replaced by other various configurations, such as a pair or parallel fingers (e.g. in the form of a two-pronged fork) between which the string 155 could be slid, but with these fingers being close enough together to prevent the beads 154 from passing therethrough; The fingers could be angled downwardly in a direction away from the opening to force the bead 156 to be raised (as for the recess 128) before being disengageable from the fingers.

Figure 10:
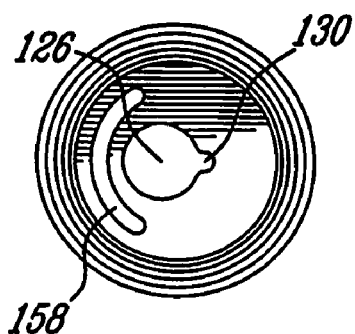
FIG. 10 is an enlarged view of the portion of the ceiling device indicated by bubble 10-10 in FIG. 8.
Figure 11:
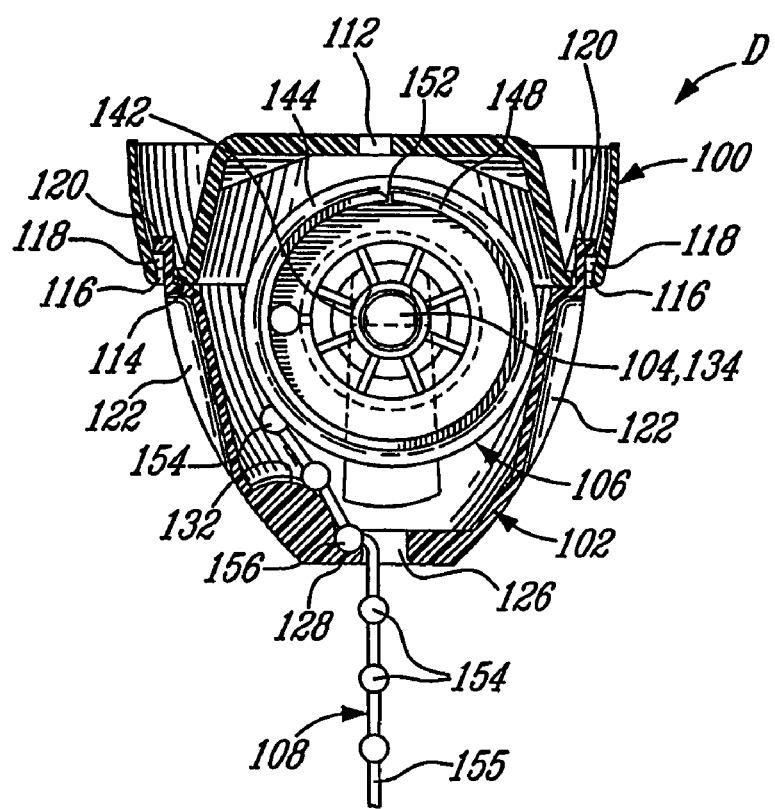
FIGS. 11 and 12 are respectively vertical front and side cross-sectional views of the ceiling device of FIG. 8.

If it is desired to vertically move the article, it is first manually slightly elevated so that the return spring force raises the given bead 156 such that it disengages from the spherical recess 128. The article is then moved sideways away from the recess 128 (FIG. 10 shows a marking 158 defined on the outside lower end of the cover 102, which indicates in which directions the beaded cable 108 can be displaced so as to then allow raising and lowering of the article). Once the beaded cable 108 has been so displaced, it defines an angle relative to the vertical that allows the cable 108 to slide through the opening 126 in the cover 102, that is without interference from the recess 128, the string 155 being located outside of the notch 130. The article can then be raised or lowered and subsequently locked into a new position by pivoting the beaded cable 108 back towards the vertical and into the notch 130 and by then slowly releasing the article, the weight of which causing a bead (i.e. the first bead located above the opening 126 and inside the cover 102) to nest in the spherical recess 128 and so become firmly engaged therein. The guide 132 ensures that the beaded cable 108 coming out of the reel 106 is at a proper angle relative to the recess 128 and opening 126.

The string/cable 155 of the beaded cable 108 can take the form of a string, a rope, a cable, etc., and can be made of various flexible materials. The use of the terms cable and string herein is meant to cover such various appropriate elongated members.

The invention claimed is:

1. A vertically adjustable fixture adapted to be secured to an overhead surface, comprising a base member adapted to be secured to a surface, a flexible elongated member retractable in and extendable out of said base member, a rotatable reel provided in said base member with said elongated member being partly wound around said reel, and a stationary locking mechanism provided in said base member and remotely of said reel, said locking mechanism being adapted in a locked position to lock said elongated member with respect to said base member, with said elongated member being selectively displaceable to disengage said locking mechanism to an unlocked position thereby allowing said elongated member to be displaced relative to said base member by selectively retracting said elongated member into, or withdrawing it from, said base member.

2. A vertically adjustable fixture as defined in claim 1, wherein said locking mechanism is provided at a lower end of said base member, said elongated member including a series of spaced apart enlargements distributed thereon, said locking mechanism being adapted to engage in said locked position at least one of said enlargements thereby preventing said elongated member from further unwinding from said reel.

3. A vertically adjustable fixture as defined in claim 2, wherein said enlargements include beads that are substantially equally spaced one after the other.

4. A vertically adjustable fixture as defined in claim 3, wherein said elongated member comprises a string extending through said beads, said beads being fixedly mounted to said string.

5. A vertically adjustable fixture as defined in claim 2, wherein said locking member includes a receiving means adapted to receive therein one of said enlargements, said elongated member between said enlargements thereof being slidable in and out of said receiving means when said one of said enlargements is dislodged from said receiving means.

6. A vertically adjustable fixture as defined in claim 5, wherein said receiving means comprise an angled retention element that opens up onto an opening defined at said lower end of said base member and through which said elongated member extends.

7. A vertically adjustable fixture as defined in claim 6, wherein said retention element comprises a recess adapted to receive said one of said beads, and a notch joining said opening and a bottom of said recess, said elongated member between said enlargements thereof being slidable in and out of said recess via said notch, wherein in said locked position said one bead is lodged in said recess with gravity forces acting downwardly on said elongated member retaining said one bead in said recess, and wherein, to disengage said one bead from said locking member, said gravity forces are sufficiently opposed for allowing said one bead to be removed from said recess thereby allowing said elongated member to be wound around, or unwound from, said reel for changing an elevation of an article suspended by said elongated member.

8. A vertically adjustable fixture as defined in claim 6, wherein said retention element comprises a pair of spaced apart fingers defining a gap therebetween which communicates at one end thereof with said opening and which is sufficiently closed at an opposed end thereof, said elongated member between said enlargements thereof being adapted to be received in said gap while said one bead is supported by said fingers, wherein in said locked position said one bead is supported by said fingers gravity forces acting downwardly on said elongated member retaining said one bead on said fingers, and wherein, to disengage said one bead from said locking member, said gravity forces are sufficiently opposed for allowing said one bead to be withdrawn from said fingers thereby allowing said elongated member to be wound around, or unwound from, said reel for changing an elevation of an article suspended by said elongated member.

9. A vertically adjustable fixture as defined in claim 8, wherein said fingers are angled downwardly in a direction away from said opening of said base member.

10. A vertically adjustable fixture as defined in claim 2, wherein a shaft is fixedly mounted in said base member, said reel being rotatable about said shaft, a biasing means being provided between said reel and a fixed part of one of said base member and said shaft, said biasing means being adapted to encourage winding of said elongated member around said reel, said biasing means exerting a spring force less than a downward force exerted on said reel by an article suspended from said elongated member, whereby in a suspended position of the article, said locking mechanism retains said one of said enlargements in said locked position, whereas to disengage said one bead from said locking member, said downward forces are sufficiently opposed to allow said elongated member to assume said unlocked position thereby allowing said elongated member to be wound around, or unwound from, said reel for changing an elevation of the article.

11. A vertically adjustable fixture as defined in claim 1, wherein a shaft is fixedly mounted in said base member, said reel being rotatable about said shaft, a biasing means being provided between said reel and a fixed part of one of said base member and said shaft, said biasing means being adapted to encourage winding of said elongated member around said reel.

12. A vertically adjustable fixture as defined in claim 11, wherein a shaft flange is provided on said shaft outwardly of said reel, said reel including a hub for receiving windings of said elongated member therearound, said hub being rotatably mounted around said shaft, first and second reel flanges being provided at opposed ends of said hub for retaining said windings around said hub.

13. A vertically adjustable fixture as defined in claim 12, wherein said hub is of frusto-conical shape.

14. A vertically adjustable fixture as defined in claim 12, wherein a wall extends between said shaft flange and said first reel flange thereby defining a chamber, said biasing means extending in said chamber between said reel and said fixed part.

15. A vertically adjustable fixture as defined in claim 14, wherein said biasing means comprises a coiled spring.

16. A vertically adjustable fixture as defined in claim 14, wherein said shaft includes said fixed part.

17. A vertically adjustable fixture as defined in claim 11, wherein an opening is defined at a lower end of said base member, said elongated member extending through said opening, said shaft being off-center with respect to said opening for providing a proper orientation to said elongated member at, and/or adjacent to, said locking member.

18. A vertically adjustable fixture as defined in claim 11, wherein an opening is defined at a lower end of said base member, said elongated member extending through said opening, said shaft being off-center with respect to said opening for providing a proper orientation to said elongated member at, and/or adjacent to, said locking member.

19. A vertically adjustable fixture as defined in claim 18, wherein a marking is provided on an outside surface of said base member for indicating to a user at least one direction in which said elongated member is to be displaced to move said locking mechanism to said unlocked position.

20. A vertically adjustable fixture as defined in claim 19, wherein said shaft is angled with respect to a vertical plane extending through a portion of said elongated member which extends outwardly of said base member and along said direction.

21. A vertically adjustable fixture as defined in claim 1, wherein a marking is provided on an outside surface of said base member for indicating to a user at least one direction in which said elongated member is to be displaced to move said locking mechanism to said unlocked position.

22. A vertically adjustable fixture as defined in claim 1, wherein a connector is provided at an end of said elongated member, which is located outside of said base member, said connector being adapted for suspending an item therefrom.

23. A vertically adjustable fixture adapted to be secured to an overhead surface, comprising a base member adapted to be secured to a surface, a flexible elongated member retractable in and extendable out of said base member, and a stationary locking mechanism provided in said base member and adapted in a locked position to lock said elongated member with respect to said base member, with said elongated member being selectively displaceable to disengage said locking mechanism to an unlocked position thereby allowing said elongated member to be displaced relative to said base member by selectively retracting said elongated member into, or withdrawing it from, said base member.

24. A vertically adjustable fixture adapted to be secured to an overhead surface, comprising a base member adapted to be secured to a surface, and a flexible elongated member retractable in and extendable out of said base member, said base member including a fixed member adapted to be mounted to the surface, a mobile member and a stationary locking member, said locking member being adapted in a locked position thereof to lock said mobile member to said fixed member and being adapted in an unlocked position thereof to allow said mobile to displace relative to said fixed member while causing said elongated member to selectively retract into, or withdraw from, said base member.

25. A vertically adjustable fixture as defined in claim 24, wherein said mobile member comprises a reel capable of rotation within said fixed member, said elongated member being wound around said reel, said locking member being adapted to engage or disengage said reel and thus respectively adopting said locked or unlocked position depending on a position of a portion of said elongated member extending below said base member, whereby said portion of said elongated member may be displaced for selectively moving said locking member into, or out of, engagement with said reel thereby respectively preventing or allowing said elongated member to be vertically displaced relative to said base member.

26. A vertically adjustable fixture as defined in claim 25, wherein said locking member is mounted to said elongated member within said base member.

27. A vertically adjustable fixture as defined in claim 24, wherein a spring is provided between said fixed member and said mobile member for urging, when in said unlocked position, said elongated member towards a retracted position.

28. A method for changing an elevation of an item suspended from a fixture, comprising the steps of:
  (a) providing a fixture having a base adapted to be mounted to an overhead surface, said base having a stationary locking mechanism, a flexible elongated member retractable in and extendable out of said base, an item attached to said elongated member being in a suspended attitude thereof, said elongated member being in a locked position with respect to said stationary locking mechanism;
  (b) elevating said item and then displacing said elongated member sideways to an unlocked position thereof with respect to said stationary locking mechanism;
  (c) selectively retracting said elongated member in said base or extending said elongated member out of said base until said item is substantially at a desired elevation; and
  (d) handling said elongated member while releasing said item such that said elongated member returns to said locked position with said item being into said suspended attitude thereof.

29. A method as defined in claim 28, wherein a reel is provided in said base with said elongated member being partly wound around said reel, said stationary locking mechanism being provided in said base and remotely of said reel, said elongated member being engaged with said locking mechanism in said locked position in step a) and disengaging therefrom by slightly elevating said item and then displacing the same sideways in step b).

30. A method as defined in claim 28, wherein in step d) said elongated member is displaced sideways to said locking mechanism with said item being then released such that said elongated member engages said locking mechanism and thus assumes said locked position using gravity forces.

* * * * *